United States Patent [19]

Meissner

[11] Patent Number: 5,485,805
[45] Date of Patent: Jan. 23, 1996

[54] COVER FOR PET CARRIER

[76] Inventor: Jay P. Meissner, 4704 Brownville Rd., Powder Springs, Ga. 30073

[21] Appl. No.: 180,971

[22] Filed: Jan. 14, 1994

[51] Int. Cl.$^6$ ................................................ A01K 31/00
[52] U.S. Cl. ............................................. 119/17; 119/19
[58] Field of Search ................................ 119/15, 17, 19; D30/108, 110, 111, 112, 161

[56] References Cited

U.S. PATENT DOCUMENTS

| D. 334,634 | 5/1993 | Greitzer | D30/108 |
| 5,081,956 | 1/1992 | Greitzer et al. | 119/19 |
| 5,289,800 | 3/1994 | Walton | 119/17 |

OTHER PUBLICATIONS

Stylette, "Pet Transport", Jun. 22, 1990.

Primary Examiner—John G. Weiss
Attorney, Agent, or Firm—Harry I. Leon; Vivian L. Steadman

[57] ABSTRACT

A cover for a portable pet carrier which can be utilized to convert the carrier into an outdoor shelter. When mounted for use on the carrier, portions of the cover overlay ventilation openings formed in the carrier which, in the absence of the cover, rain could enter. These portions define a pair of laterally protruding awnings which, while they keep out rainwater, allow air to circulate freely through the ventilation openings. In addition, a hood extends longitudinally from one end of the cover and serves to shield an entrance to the carrier from rain and the like while allowing an animal unobstructed ingress and egress through the entrance. In general, exterior surfaces of the cover are sloped so as to cause rainwater to run off of the cover rather than to accumulate on it. To facilitate shipping the carrier with the cover mounted thereon, the cover is sized so that its greatest transverse width does not exceed that of the carrier. Moreover, the overall height of the cover in combination with the carrier is only slightly greater than the height of the carrier by itself, the height of the combination being increased generally only by the thickness of the material from which the cover is fabricated. Together the cover and the carrier make a dog house which can easily be transported into the field to shelter hunting dogs and the like.

2 Claims, 3 Drawing Sheets

COVER FOR PET CARRIER

BACKGROUND OF THE INVENTION

Among the prior art pet carriers are those taught by Gregory, U.S. Pat. No. 3,710,761, issued in 1973, and by Goetz, U.S. Pat. Nos. 4,852,520 and D308,588, issued in 1989 and in 1990, respectively. Intended for use in transporting animals on airplanes, such pet carriers have structures which are sufficiently light in weight that they can be carried or, alternately, moved about on their own wheels.

These structures, typically fabricated from a durable plastic, give the carrier a potential serviceable lifetime of many years. Unfortunately, most owners have only very infrequent opportunities to use their carriers. Equipped with large ventilation openings located proximate with their top edges, prior art carriers offer very little weather protection for any would-be occupant(s), making the carriers unsuitable for outdoor service. Owners are left with little choice but to store the carriers, each of which takes up a large amount of storage space, between trips.

SUMMARY OF THE INVENTION

The primary object of the present invention is to provide means for converting any one of a variety of box-like shipping containers used to transport live animals on common carriers into an animal shelter suitable for outdoor use.

A further object of this invention is to provide means for converting common pet carriers into housing for animals which can be easily assembled and carried on a pickup truck, open trailer or the like into the field.

The cover comprises an article having a generally flat top wall which, in plan view, is substantially rectangular in shape and two sets of opposing pairs of generally vertical side walls. The vertical side walls within each set of opposing pairs diverge downwardly. Junctures between each contiguous pair of vertical side walls and between each side wall and the top wall are water-tight. The four side walls and the top wall define a cavity for receiving a substantial portion of the upper half of a conventional pet carrier which, like the cover, has opposing pairs of side walls which diverge downwardly.

In addition, three of the side walls are interrupted by cutouts. One of these cutouts is formed in the front side wall and can be aligned with an entrance in the carrier to allow a pet ingress thereinto and egress therefrom. A hood extends longitudinally from the cover above this cutout and shields the entrance from falling rainwater. The remaining two cutouts are similarly alignable with pre-existing openings in the carrier. To protect ventilation openings in the carrier formed proximate with its ceiling, awnings extend laterally from two opposing side walls of the cover disposed generally perpendicularly to its front side wall. While each awning extends far enough outwardly from the carrier to allow free circulation of air through the ventilation openings, the cover, in its greatest transverse width, does not exceed the greatest transverse width of the carrier. Junctures between each side wall and awning and between the front side wall and the hood are water-tight. Moreover, the overall height of the cover in combination with the carrier is only slightly greater than the height of the carrier by itself, the height of the combination being increased generally only by the thickness of the material from which the cover is fabricated. Together the cover and the carrier make a dog house which can easily be transported into the field to shelter hunting dogs and the like.

DETAILED DESCRIPTION OF THE PREFERRED EMBODIMENT

Figure 1:
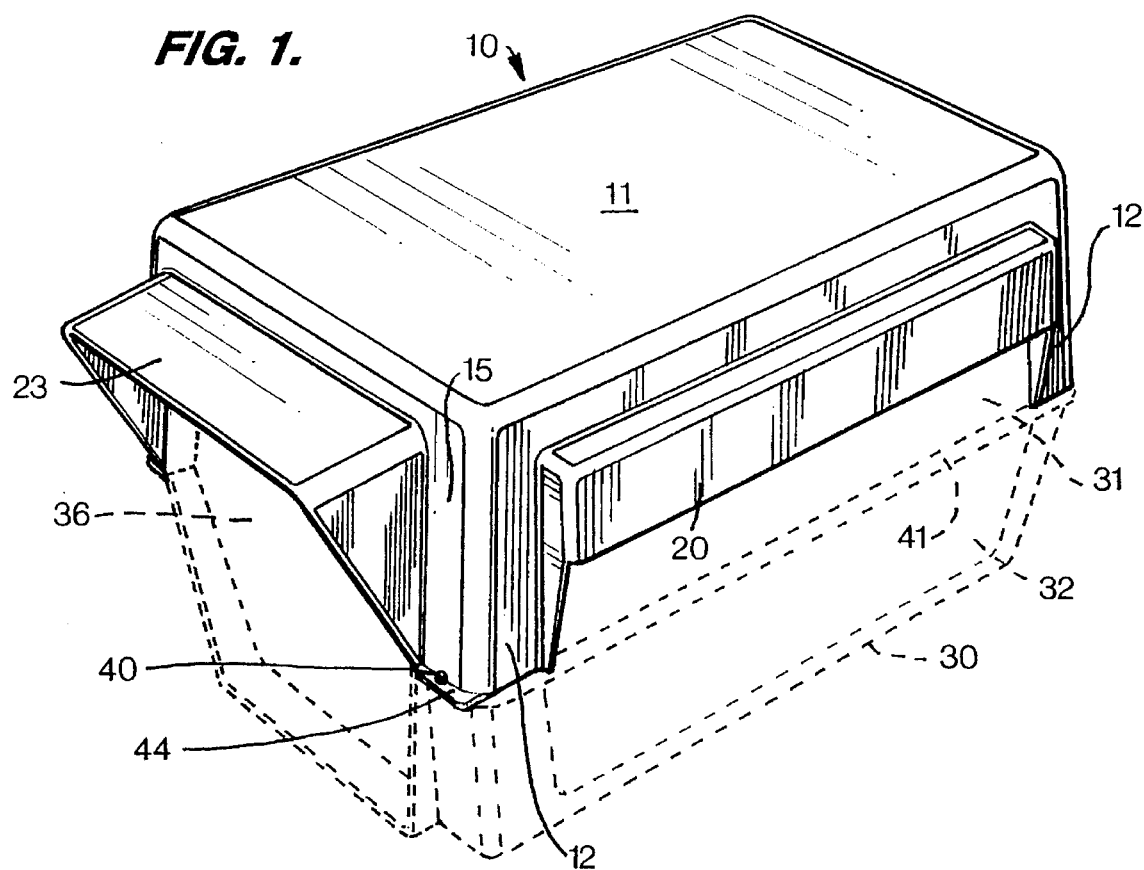
FIG. 1 is a frontal perspective view of the pet carrier cover according to the present invention, the pet carrier being shown in dashed lines.
Figure 2:
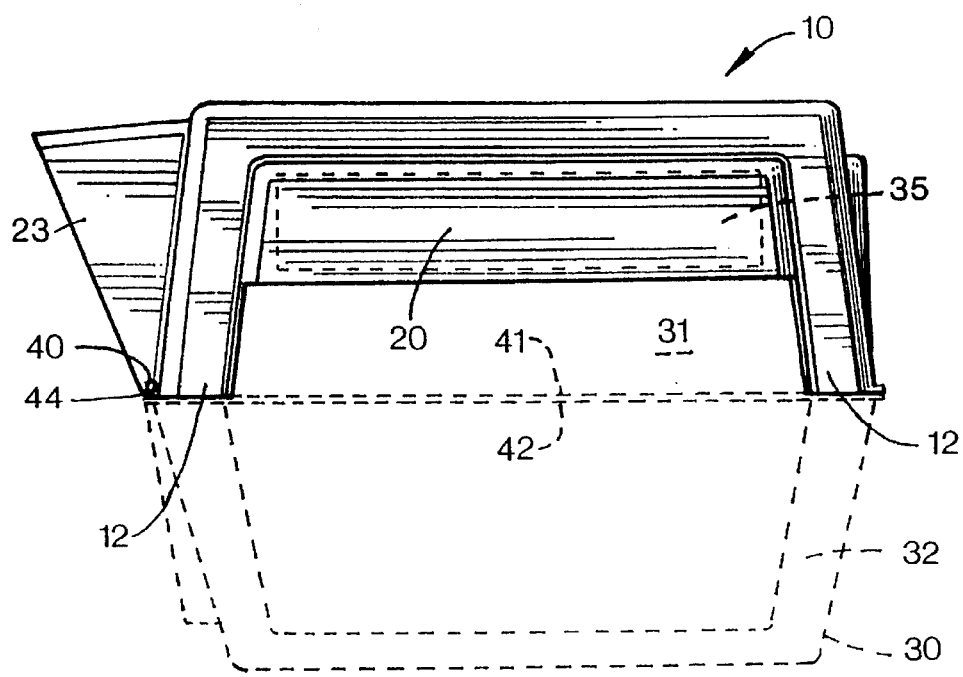
FIG. 2 is a side elevation view of the cover according to FIG. 1.
Figure 3:
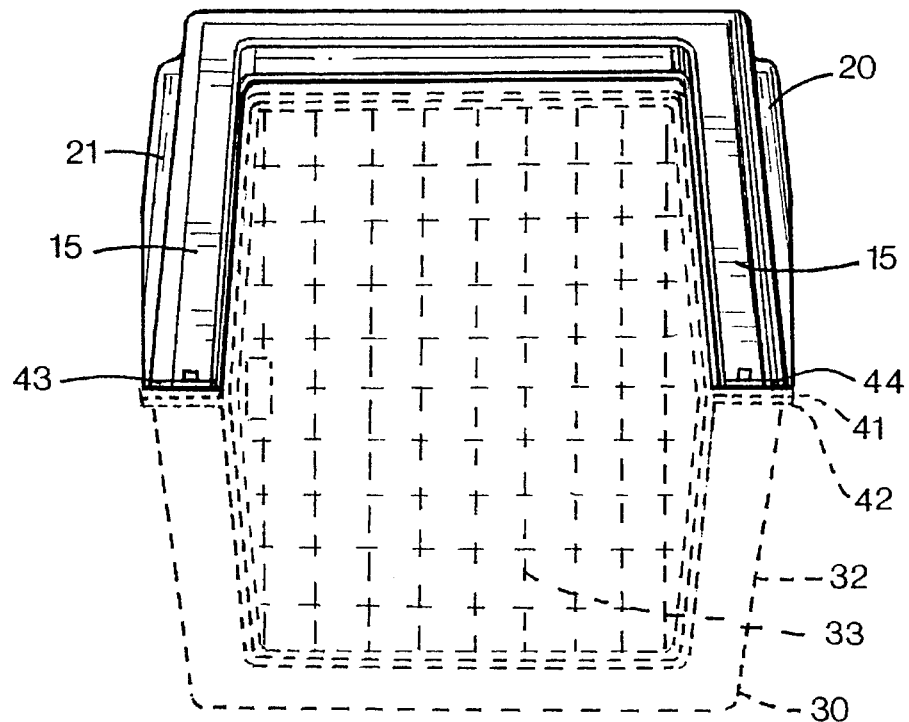
FIG. 3 is a front elevation view of the cover according to FIG. 1.
Figure 4:
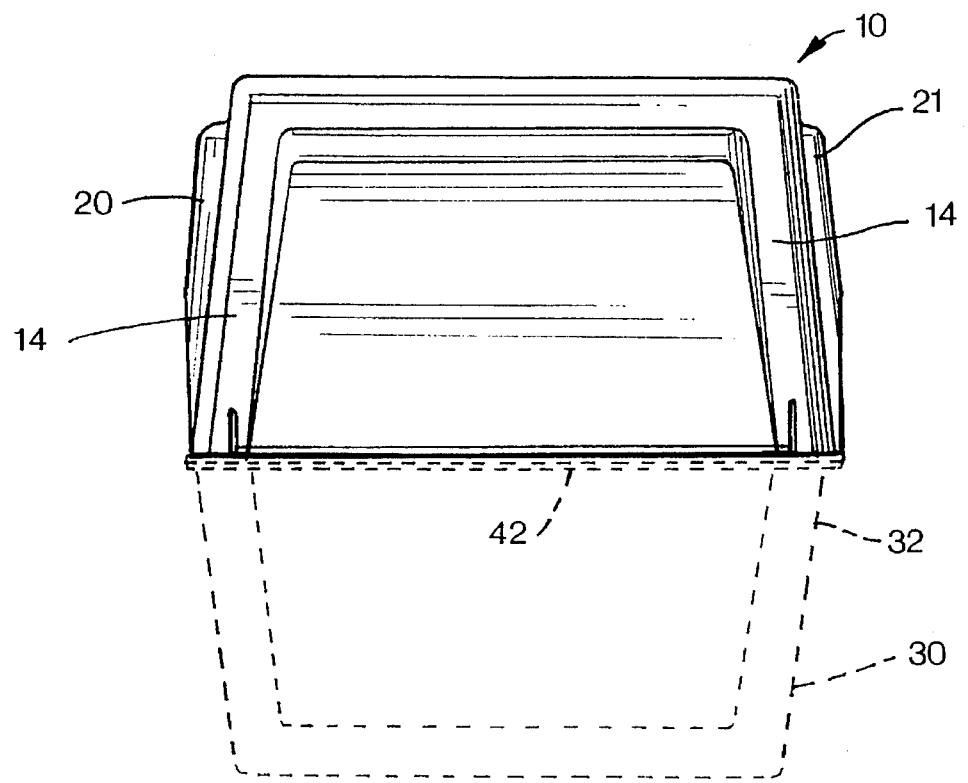
FIG. 4 is a rear elevation view of the cover according to FIG. 1.
Figure 5:
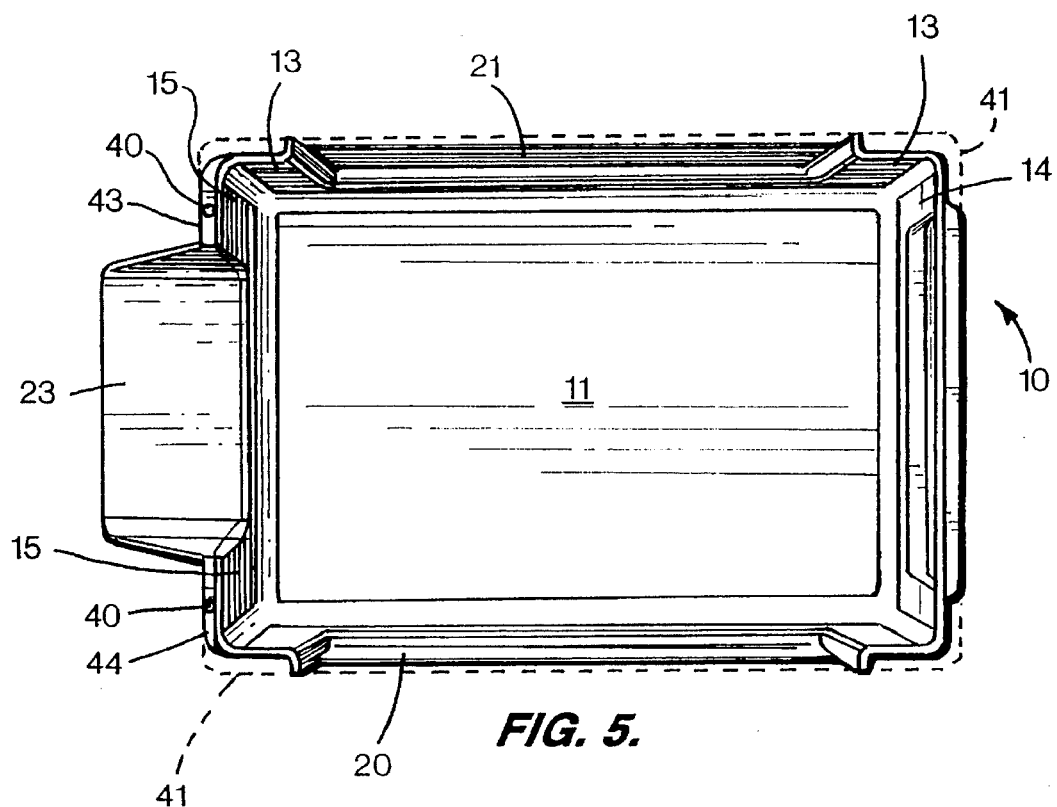
FIG. 5 is a top plan view of the cover according to FIG. 1.
Figure 6:
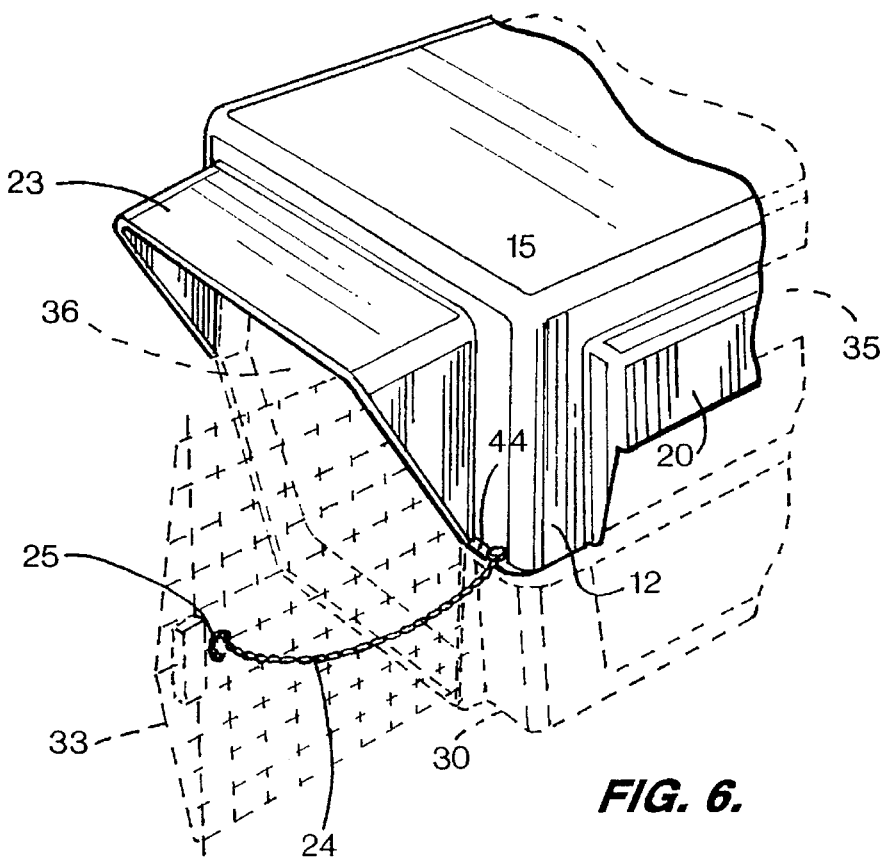
FIG. 6 shows a frontal perspective view showing a fragmentary portion of the cover according to FIG. 1, the carrier being illustrated with a wire door attached thereto and in the open position.

With reference to the drawings, a cover according to the present invention is indicated generally by the reference numeral 10. In use, the cover is mounted atop a pet carrier 30 equipped with a plurality of cross ventilation openings 35 provided in its walls proximate with its ceiling. A typical carrier 30 is one formed by joining together, with bolts 40, two flanged sections 31, 32.

The cover 10 has a generally flat top wall 11 and opposing pairs of generally vertical side walls 12, 13 and 14, 15. The four side walls 12, 13, 14, 15 and the top wall 11 define a water-tight cavity with downwardly diverging interior surfaces for receiving a substantial portion of the upper flanged section 31. Preferably, when the section 31 is so received, the side walls 12, 13, 14, 15 rest on a flange 41 defining the lower edge of the section 31; and a substantial portion of its outer walls above the flange fit snugly within the cavity, with the cover 10 being generally form-fitting.

Protrusions which extend laterally from side walls 12, 13 of the cover 10 defines a pair of awnings 20, 21, respectively. The awnings 20, 21 shield cutouts which are formed in the side walls 12, 13 and which are generally alignable with the ventilation openings 35 in the upper flanged section 31. The awnings 20, 21 keep falling rain drops from entering through the side wall cutouts. Each awning 20, 21 extends far enough outwardly from its contiguous side wall 12, 13 and the cutout formed therein to allow free circulation of air through the ventilation openings 35.

Nevertheless, the lateral extension of each awning 20, 21 is such that none of the transverse cross-sections of the cover 10 exceeds, in overall width, any of the transverse cross-sections of the carrier 30 by itself. The transverse cross-section having the greatest overall width, for the cover 10 in combination with the carrier 30 as well for the carrier by itself, remains the cross-section in which the flange 41 lies, thereby facilitating transport of the cover/carrier combination by common carrier.

Similarly to the awnings 20, 21 protruding from the side walls 12, 13, a hood 23 extends forwardly from the front wall 15. The hood is employed to shield a cutout defined by the wall 15 which is generally alignable with an entrance 36 formed in the carrier 30 through which pet may enter or exit the carrier when its hinged openwork door 33 is open.

In the preferred embodiment, the cover 10 is equipped with means for holding the openwork door 33 open. The holding means comprises a small chain 24 connected to a hook 25, magnet, latch or the like which can be attached to the open door 33 to limit its travel.

When the cover 10 is properly sized and shaped to fit a particular carrier 30, the cover 10 does not need any fasteners to hold it in position. However, under especially windy conditions, double-sided tape is preferably placed between the top wall 11 of the cover 10 and the carrier 30 to secure it thereto. If more permanent fasteners are desired, bolts holding the flanged sections 31, 32 together can also be utilized to secure a pair of flanges 43, 44 disposed proximate with the lower edge of the front wall 15. In the latter case, holes (not shown) in the flanges 43, 44 alignable with pre-existing holes formed in the flanges 41, 42 are provided for receiving the bolts 40.

It is understood that those skilled in the art may conceive other applications, modifications and/or changes in the invention described above. Any such applications, modifications or changes which fall within the purview of the description are intended to be illustrative and not intended to be limitative. The scope of the invention is limited only by the scope of the claims appended hereto.

It is claimed:

1. A cover for mounting on a live animal shipping container having at least one ventilation opening, comprising:

(a) a top wall and one first side wall which extends downwardly therefrom, the first side wall having a cutout with distal side edges formed therein which, when the cover is mounted on the container, overlays and is at least as large as the ventilation opening;

(b) an awning which extends laterally from the first side wall, the awning defining a structure having first and second side protrusions which extend generally perpendicularly from the first side wall and which oppose each other along the distal side edges of the cutout, the awning preventing rain from entering through the cutout formed in the first side wall and into any ventilation opening which the cutout overlays while allowing free circulation of air through the ventilation opening; and (c) second, third and fourth side walls, the first and second side walls and the third and fourth side walls forming first and second pairs of opposing side walls, respectively; the top wall and the two pairs of opposing side walls defining a watertight cavity.

2. A cover for mounting on a live animal shipping container having at least one ventilation opening formed therein, comprising:

(a) a top wall and at least one side wall which extends downwardly therefrom, each side wall having a cutout with opposing generally vertical side edges formed therein which, when the cover is mounted on the container, overlays and is at least as large as the ventilation opening; each side wall having a bottom edge which is formed in at least two segments, segments of the bottom edge of the side wall being spaced apart from each other and being separated by the cutout; and (b) an awning which extends laterally from the side wall, the awning defining a structure having first and second side protrusions which extend generally perpendicularly from the side wall and which oppose each other along the generally vertical side edges of the cutout, the awning partially shielding the cutout formed therein so as to prevent rain from entering through the cutout and into the ventilation opening while allowing free circulation of air through the ventilation opening.

* * * * *